US007747558B2

(12) United States Patent
Martinez Smith et al.

(10) Patent No.: US 7,747,558 B2
(45) Date of Patent: Jun. 29, 2010

(54) METHOD AND APPARATUS TO BIND MEDIA WITH METADATA USING STANDARD METADATA HEADERS

(75) Inventors: Alfonso Martinez Smith, Algonquin, IL (US); Eric P. Grebner, Batavia, IL (US)

(73) Assignee: Motorola, Inc., Schaumburg, IL (US)

( * ) Notice: Subject to any disclaimer, the term of this patent is extended or adjusted under 35 U.S.C. 154(b) by 301 days.

(21) Appl. No.: 11/759,701

(22) Filed: Jun. 7, 2007

(65) Prior Publication Data
US 2008/0306971 A1 Dec. 11, 2008

(51) Int. Cl.
*G06F 17/30* (2006.01)
(52) U.S. Cl. .................................... 707/101; 707/104.1
(58) Field of Classification Search ............... 707/1, 707/2, 6, 10, 100, 101, 200, 3, 104.1
See application file for complete search history.

(56) References Cited

U.S. PATENT DOCUMENTS

| | | | |
|---|---|---|---|
| 5,185,698 | A | 2/1993 | Hesse et al. |
| 5,699,125 | A | 12/1997 | Rzeszewski et al. |
| 6,532,121 | B1 * | 3/2003 | Rust et al. ............... 707/101 |
| 6,635,088 | B1 | 10/2003 | Hind et al. |
| 6,825,781 | B2 | 11/2004 | Seyrat et al. |
| 6,839,715 | B1 | 1/2005 | Zander |
| 6,883,137 | B1 | 4/2005 | Girardot et al. |
| 6,993,196 | B2 | 1/2006 | Sun et al. |
| 7,043,686 | B1 | 5/2006 | Maruyama et al. |
| 7,143,397 | B2 | 11/2006 | Imaura |
| 7,337,392 | B2 * | 2/2008 | Lue ........................ 715/234 |
| 7,346,598 | B2 | 3/2008 | Arora et al. |
| 7,349,911 | B2 * | 3/2008 | Kusama et al. ............ 707/100 |
| 7,509,353 | B2 * | 3/2009 | Kelkar et al. ............. 707/203 |
| 7,516,145 | B2 * | 4/2009 | Sikchi et al. ............. 707/102 |
| 2002/0065822 | A1 | 5/2002 | Itani |
| 2002/0088010 | A1 | 7/2002 | Dudkiewicz et al. |

(Continued)

FOREIGN PATENT DOCUMENTS

EP 1045315 A2 10/2000

(Continued)

OTHER PUBLICATIONS

Digital Imaging Group Inc; "DIG35 Specification"; Version 1.0; Aug. 30, 2000; 165 Pages.

(Continued)

*Primary Examiner*—Mohammad Ali
*Assistant Examiner*—Marc R Filipczyk
(74) *Attorney, Agent, or Firm*—Gary J. Cunningham

(57) ABSTRACT

A method for embedding metadata into a media file (100) comprises providing (204) a metadata schema file (204) and a metadata instance file (206). Providing a media file having a binary capable user field. Then compressing (208) the metadata schema by a first compression method; and assembling (210) the compressed metadata schema fragments. Also, compressing (212) the metadata instance file and assembling (210) the compressed metadata instance fragments. Setting a media file header (214) or footer to indicate binary data payload. The method further comprises appending (216) a data start label to the assembled metadata schema and the assembled metadata instance and inserting (218) the assembled metadata schema and the metadata instance into the binary capable user field of the media file.

12 Claims, 5 Drawing Sheets

U.S. PATENT DOCUMENTS

| | | |
|---|---|---|
| 2002/0107866 A1 | 8/2002 | Cousins et al. |
| 2002/0126666 A1 | 9/2002 | Rising, III et al. |
| 2003/0001901 A1 | 1/2003 | Crinon et al. |
| 2003/0002515 A1 | 1/2003 | Crinon et al. |
| 2003/0005444 A1 | 1/2003 | Crinon et al. |
| 2003/0051245 A1 | 3/2003 | Klopfenstein |
| 2003/0101451 A1 | 5/2003 | Bentolila et al. |
| 2003/0123701 A1 | 7/2003 | Dorrell et al. |
| 2003/0149934 A1 | 8/2003 | Worden |
| 2004/0003343 A1* | 1/2004 | Liao et al. ............... 715/501.1 |
| 2004/0013307 A1 | 1/2004 | Thienot et al. |
| 2004/0049790 A1 | 3/2004 | Russ et al. |
| 2004/0054692 A1 | 3/2004 | Seyrat et al. |
| 2004/0068696 A1 | 4/2004 | Seyrat et al. |
| 2004/0096110 A1 | 5/2004 | Yogeshwar et al. |
| 2004/0139393 A1 | 7/2004 | Heuer et al. |
| 2004/0186841 A1 | 9/2004 | Heuer et al. |
| 2004/0193581 A1 | 9/2004 | Heuer et al. |
| 2004/0225754 A1 | 11/2004 | Lee |
| 2005/0086639 A1 | 4/2005 | Min et al. |
| 2005/0120029 A1 | 6/2005 | Tomic et al. |
| 2005/0138047 A1 | 6/2005 | Liu et al. |
| 2005/0165848 A1 | 7/2005 | Kusama et al. |
| 2005/0228811 A1 | 10/2005 | Perry |
| 2005/0275566 A1 | 12/2005 | Lahtiranta et al. |
| 2006/0062059 A1 | 3/2006 | Smith et al. |
| 2006/0218161 A1 | 9/2006 | Zhang et al. |
| 2007/0143644 A1 | 6/2007 | Aldereguia et al. |
| 2007/0162479 A1 | 7/2007 | Begun et al. |
| 2007/0300147 A1 | 12/2007 | Bates et al. |
| 2007/0300247 A1 | 12/2007 | Kim et al. |
| 2008/0077606 A1 | 3/2008 | Fang et al. |

FOREIGN PATENT DOCUMENTS

| | | |
|---|---|---|
| EP | 1316220 B1 | 12/2004 |
| EP | 1356595 B1 | 9/2006 |
| EP | 1407610 B1 | 9/2006 |
| EP | 1399857 B1 | 6/2008 |
| FR | 2813743 A1 | 3/2002 |
| FR | 2820563 A1 | 8/2002 |
| WO | 9734240 A1 | 9/1997 |
| WO | 0221848 A1 | 3/2002 |
| WO | 0233977 A1 | 4/2002 |
| WO | 02052857 A2 | 7/2002 |
| WO | 02063776 A2 | 8/2002 |
| WO | 02082814 A2 | 10/2002 |
| WO | 03001404 A2 | 1/2003 |
| WO | 03001811 A1 | 1/2003 |
| WO | 2004051502 A2 | 6/2004 |
| WO | 2005008521 A1 | 1/2005 |

OTHER PUBLICATIONS

ICT's XML-XRESS; Dec. 2000; XP-002179806; 6 pages.

WAP Binary XML content format; Document id WAP-192-WBXML-20000515; Version 1.3; Approved Version 15th May 2000; 26 pages.

J.M. Barton "Television Meta-Data Standard Overview and Opportunities", Digest of Technical Papers of the 2000 International Conference on Consumer Electronices 2000, ICCE 2000, Los Angeles, CA, Jun. 2000, pp. 28-29.

M. Leban "Internet Search for TV Content Based on TV Anytime", Proceedings of IEEE Eurocon 2003, Ljubljana, Slovenia, Sep. 2003, vol. 2, pp. 70-73.

TV-Anytime Forum, "Specification Series: S-3 on Metadata, Part A: Metadata Schemas", Doc. No. SP003v13 Part A, Version 1.3, Dec. 2002.

T. Takagi, S. Kasuya, M. Mukaidono, T. Yamaguchi, "Conceptual Matching and its Applications to Selection of TV programs and BGMs", Proceedings of the IEEE 1999 International Conference on System, Man, and Cybernetics, Tokyo, Japan, Oct. 1999, vol. 3, pp. 12-15.

* cited by examiner

METHOD AND APPARATUS TO BIND MEDIA WITH METADATA USING STANDARD METADATA HEADERS

This application is related to application entitled "A METHOD AND APPARATUS FOR FACILITATING EFFICIENT PROCESSING OF EXTENSIBLE MARKUP LANGUAGE DOCUMENTS," Motorola case number CML03499EV, filed on 26 Sep. 2006 and commonly assigned to the assignee of the present application and which is hereby incorporated by reference.

This application is also related to application entitled "A COMPRESSED SCHEMA REPRESENTATION OBJECT AND METHOD FOR METADATA PROCESSING," Motorola case number CML002689EV, filed on 21 Dec. 2005 and commonly assigned to the assignee of the present application and which is hereby incorporated by reference.

TECHNICAL FIELD

This invention relates generally to binding metadata to media and more particularly to binding standard, compressed, metadata to media.

BACKGROUND

Media files generally contain the media content data as well as other information that may describe the media file such as headers or information that describes the content contained therein such as metadata. Metadata pertaining to a still image, for example, can be embedded into a header of the image file which in one exemplary embodiment is an image e using the JPEG format having and EXIF (Exchangeable Image File Format) header. The EXIF standard supports metadata related to attributes of the image's content. These attributes are stored in tags incorporated into the EXIF. Semantic image metadata, for example, is carried in either the "ImageDescription" or "UserComment" tags of the file. In order to enrich the metadata vocabulary and therefore the features available to applications, it is only possible to use a formatted-text syntax in "UserComment" tag. The ImageDescription tag is not appropriate, since it cannot carry binary payloads. While this solution is simple, it is constrained by the amount of metadata tags that can be efficiently used. Richer metadata vocabularies exist and can be expressed in textual format. Such is the case of MPEG-7, for example, which is expressed in XML. However, a textual MPEG-7 XML description is typically too verbose to be efficiently carried in the User-Comment tag of an EXIF header. Therefore, a better solution is necessary to embed rich metadata in a metadata header capable of binary data payloads.

BRIEF DESCRIPTION OF THE DRAWINGS

The above needs are at least partially met through provision of the method and apparatus for facilitating efficient processing of metadata documents described in the following detailed description, particularly when studied in conjunction with the drawings, wherein.

Figure 1:
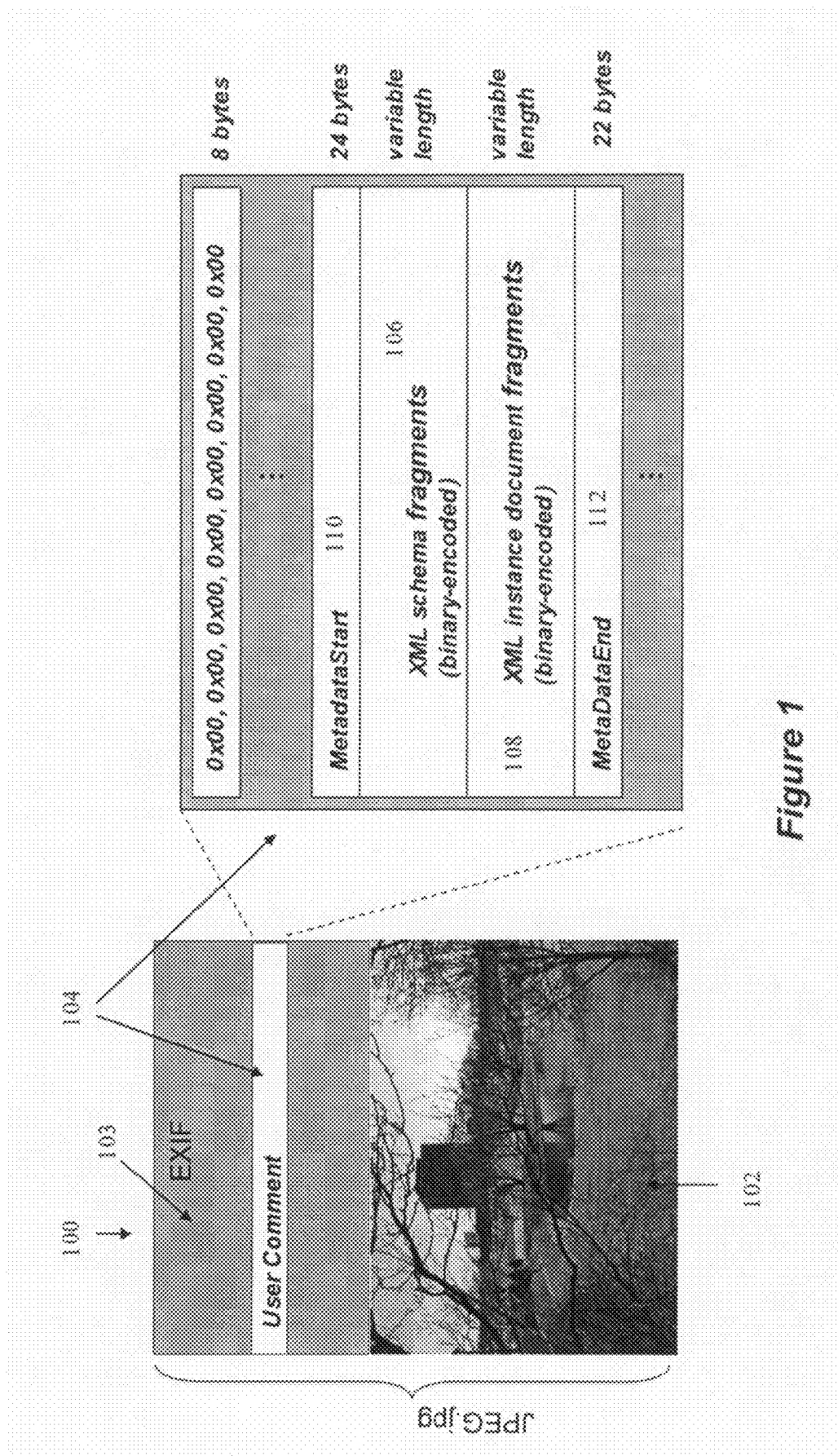
FIG. 1 comprises a representation of the structure of an EXIF header in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

A method and apparatus for embedding (also referred to as binding) a binary version of a rich-vocabulary metadata description in a binary capable user field of a media file header is disclosed. In addition to the rich-vocabulary metadata, it is to be understood that other information, may also be embedded, such as binary schemas or token tables, some of which may be required to decode the rich-vocabulary metadata are also disclosed. Binding the metadata to the media file in the UserComment field provides the ability to increase the number of features available though rich-vocabulary metadata while using standard decoders as well as allowing for unrestricted data sizes to be stored in the media file itself.

It is to be understood that binding the metadata may also be referred to as embedding, inserting appending, storing or the like.

In one embodiment, a media file having binary capable user field of which at least a portion thereof is used to store binary metadata schema and a binary metadata instance as binary data payload, having a start and end indicator is provided. The start and end indicators signal to a parser of a decoders the beginning and end of a particular data set. The indicators may also be referred to as labels, alerts markers and the like. The target metadata schema and the target instance file are compressed and assembled into fragments in binary form allowing for large amounts of data to be stored in the binary capable user field of the media file, decodable by standard, "off-the-shelf" decoders, such as an MPEG 7 decoder for example. The labels alert the parser of the decoder decoding the media file of the presence of the target metadata.

The embedded binary metadata is surrounded by the start and end labels which are formatted text labels to indicate the start and end of the binary metadata within the binary capable user field. Other data, not associated in any way with the metadata may also coexist in the binary capable user field. This other data is distinguished from the metadata by the labels associated with the metadata.

The binary metadata may contain a rich structure due to the nature of an associated metadata schema. In one embodiment, a fragmentable binary metadata description is used, carrying only segments of attributes associated with the content of the media file.

In an alternate embodiment, the ancillary information required to decode the binary metadata may be any other data structure for that purpose, such as a token table.

One advantage of storing this information in the binary capable user field is that the amount of metadata that may be stored in the media file is not limited and persistent binding of the media and the metadata is accomplished.

Another advantage is that the metadata, and the media file headers are standard. There is no need to require non standard data types. Compression methods may be used to compress the metadata schema and instance data to reduce their size, however the binary capable user field is unlimited which is not so if the data is stored elsewhere in the media file.

Yet another advantage is that fragmenting an XML schema into the binary capable user field is more efficient then bundling an entire XML schema into the binary capable user field. As would be understood by one of ordinary skill in the art, only fragments of the compressed files are necessary as opposed to including the entire document. In one embodiment, the fragmented binary metadata description is achieved with an XML compression method wherein metadata is represented by an Instance Table (IT). The IT is made up of linked individual entries describing the particles of the XML instance document. With this method, a Schema Information Table (SIT) that describes the XML schema is built independently by a metadata decoder, starting from the XML schema that generates the instance document. Therefore relevant portions of the XML schema are also embedded in the binary capable user field. An efficient method is achieved by generating the fragmentable binary XML schema using a look-up table made up of linked individual entries describing XML schema particles. This look-up table is built using only entries corresponding to the particles that will be used in the instance document.

These and other benefits may become clearer upon making a thorough review and study of the following detailed description. Referring now to the drawings, and in particular to FIG. 1, a media file 100, which has an EXIF header 103 in this embodiment, is represented. The EXIF header 103 includes inter alia, a binary capable user field which is referred to as a UserComment field 104 in the EXIF standard. The UserComment field does not necessarily need to be apart of the EXIF standard which is used here as an example for one embodiment. The UserComment field 104 structure 106 is shown by way of exploded view. The media file 100 contains the content data 102, which is picture data in this embodiment, and in this embodiment is in JPEG format. In the user comment filed, the metadata schema fragments 106 and the metadata instance fragments 108 are embedded between the metadata start 110 and the metadata end 112 labels.

Figure 2:
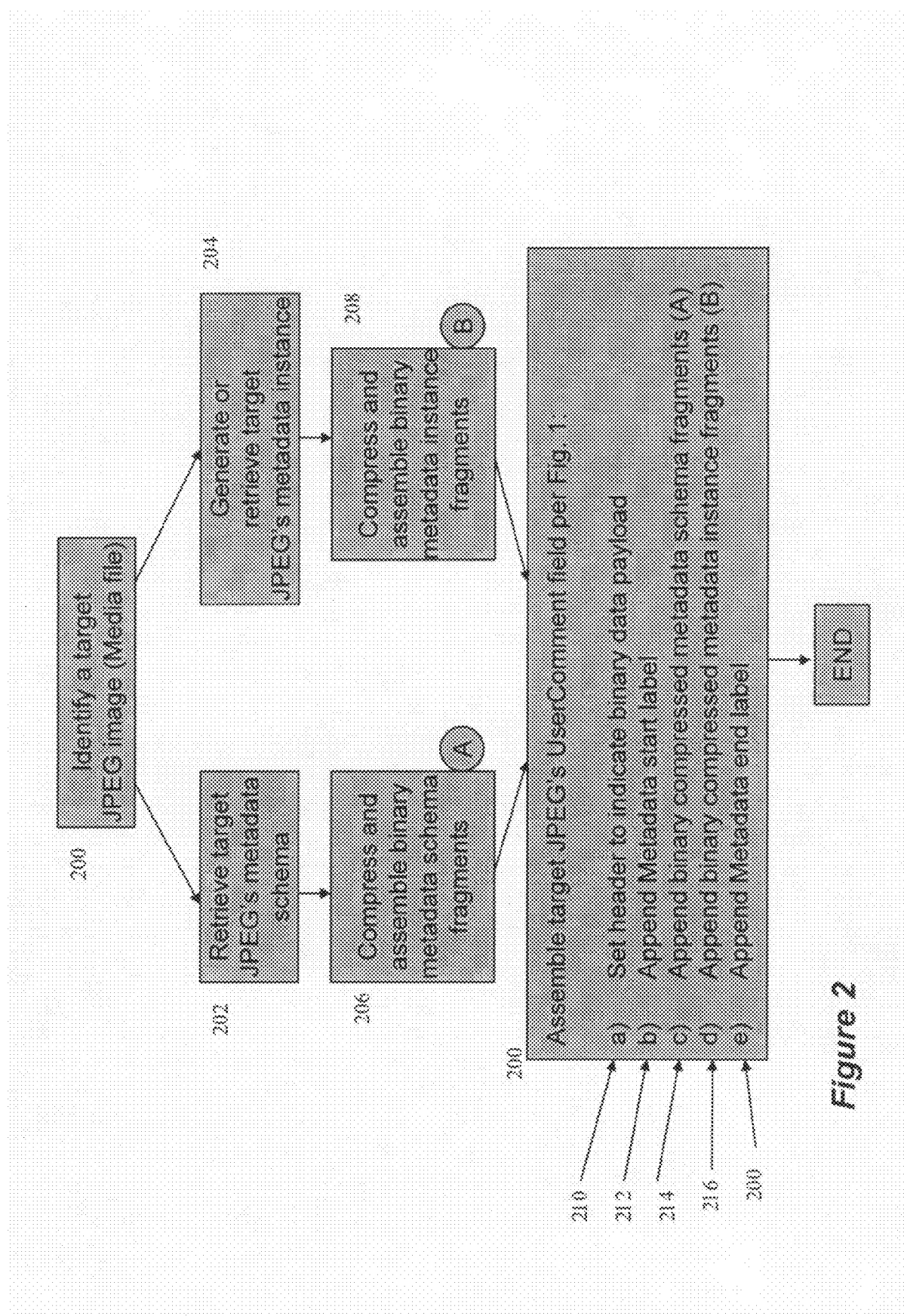
FIG. 2 comprises a flow diagram of a method for encoding metadata into a media file.

Referring now to FIG. 2, a flow diagram is shown illustrating the method for binding the metadata to the media file 100. First, the method comprises providing a media file 200 and a metadata schema file 202 and a metadata instance file 204 to be associated with the media file. The media file having a UserComment portion, which in this embodiment is the UserComment tag of the EXIF header of the JPEG file. The UserComment portion having the capability to accept text characters. In other embodiment, the text field may be referred to as a comment field, text field or the like and the nomenclature will not limit the field or portion of the media file to be used. Then compressing the metadata schema 206 by a first compression method and assembling the compressed metadata schema fragments. Although the particular order of steps is insignificant, the method further comprises compressing the metadata instance file 208 and assembling the compressed metadata instance fragments. In this embodiment, the header of the EXIF header is set to indicate binary data payload. Further, the method comprises assembling the UserComment field 104 by setting 210 the header to indicate that the payload is binary data.

Then appending 212 a start label, which in this embodiment is identified in FIG. 2 as the metadatastart label to the assembled metadata schema and the assembled metadata instance. In this embodiment, there is one start label for both the assembled metadata schema and the assembled metadata instance. In another embodiment, each of the assembled metadata schema and the assembled metadata instance may have their own start label. The assembled metadata schema and the metadata instance are appended 214, 216 into the UserComment field 104 of the EXIF header 103 of the media file.

This method is intended to alert EXIF parsers designed to understand the metadata syntax about the presence of the dedicated metadata in the UserComment field. Other EXIF parsers will simply ignore the formatted metadata. Therefore the parser must be aware of the start and end labels in order to extract and decode the data from the UserComment tag.

Figure 3:
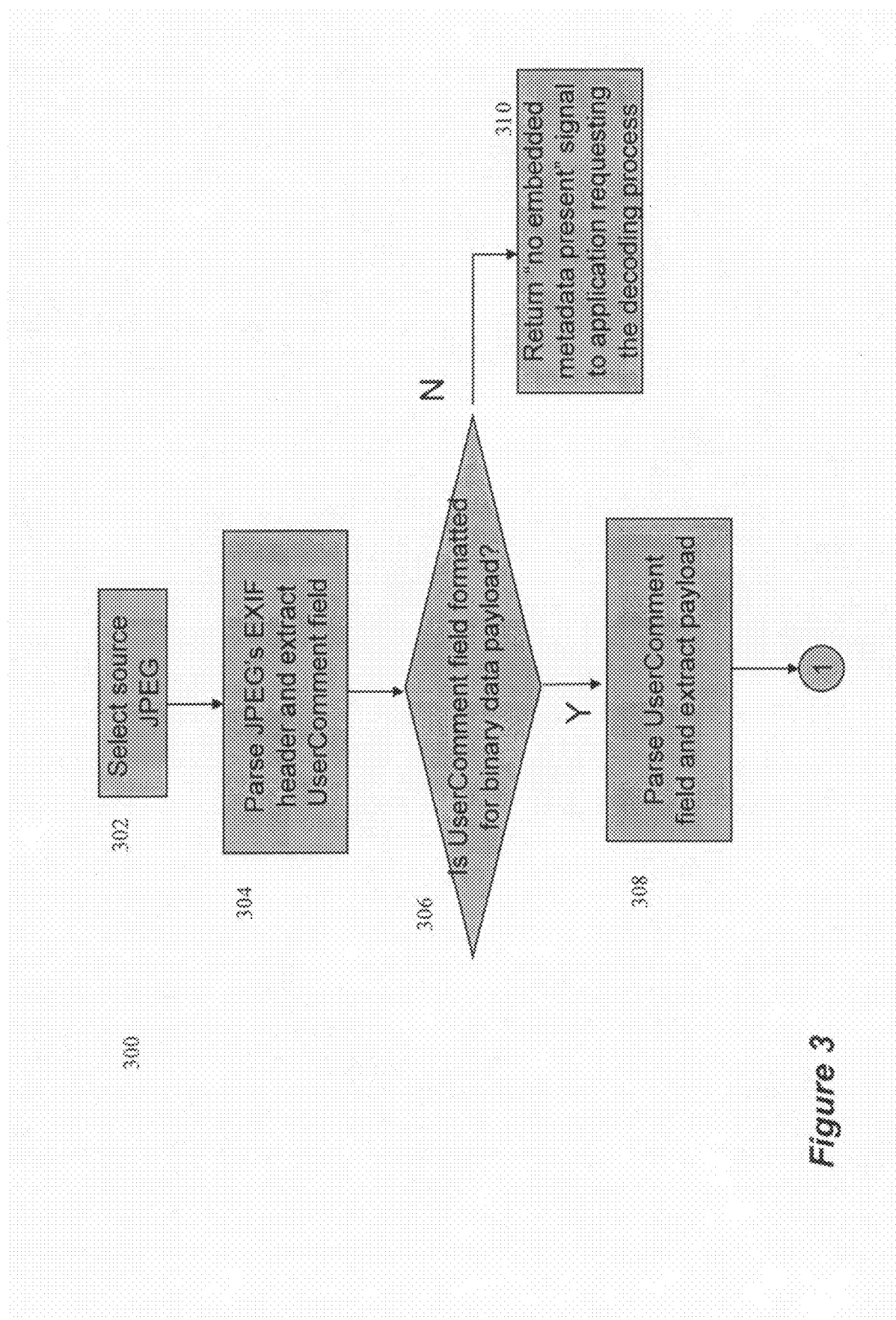
FIG. 3 comprises a flow diagram of a method for decoding metadata bound to a media file.
Figure 3:
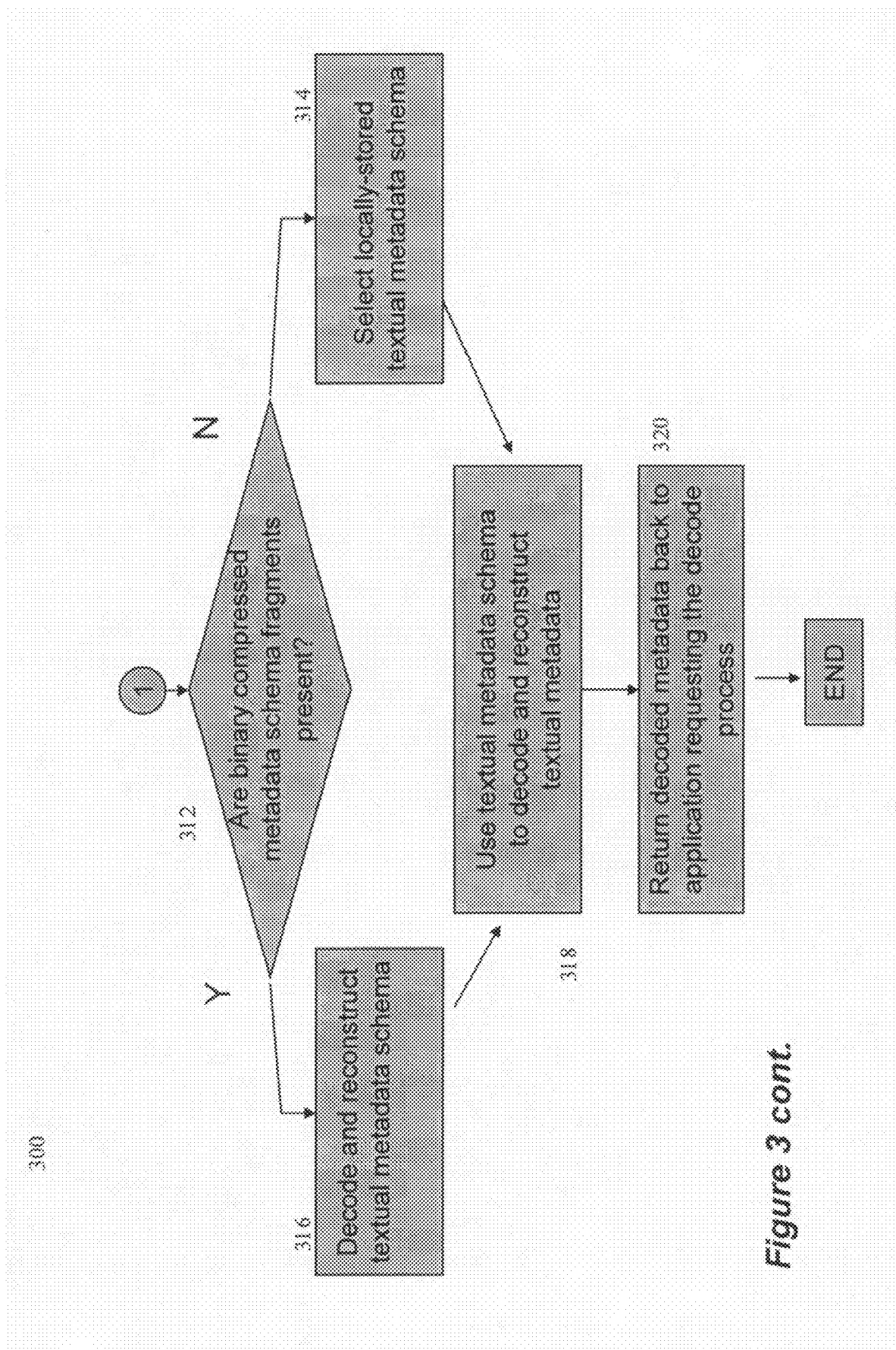

Moving to FIG. 3, a flow diagram is shown illustrating the method for decoding the metadata from the media file 100. Once the source media file (a JPEG file in this exemplary embodiment) 100 is selected 302, the media file's EXIF header is parsed 304 in order to identify and extract the data from the UserComment tag. The parser determines if the data payload of the UserComment tag is binary 306. If the data payload is binary the parser determines if there is a data label indicating the presence of the metadata embedded in FIG. 2. If the payload data is not binary, the parser will return 310 a no embedded metadata present to the application that requested the decoding.

Once the payload data has been extracted (308) the parser then determines (312) whether the payload includes metadata schema fragments. In this exemplary embodiment, the parser determines if the metadata schema is included by at least one of the binary data tables in the payload. It should also be understood that some tables are for the schema and some tables are for the instance. In one embodiment the metadata schema is not present in the payload, while the instance table is. If the payload is not metadata schema fragments, the parser will select (314) a locally stored textual metadata schema. If the parser determines (312) that metadata schema fragments are present, then the decider decodes (316) and reconstructs the metadata schema. Then the decoder uses the textual metadata schema to decode and reconstruct 318 the rich metadata outputting it in a textual format. Then the decoder returns 320 the decoded metadata to the application that requested the metadata.

Figure 4:
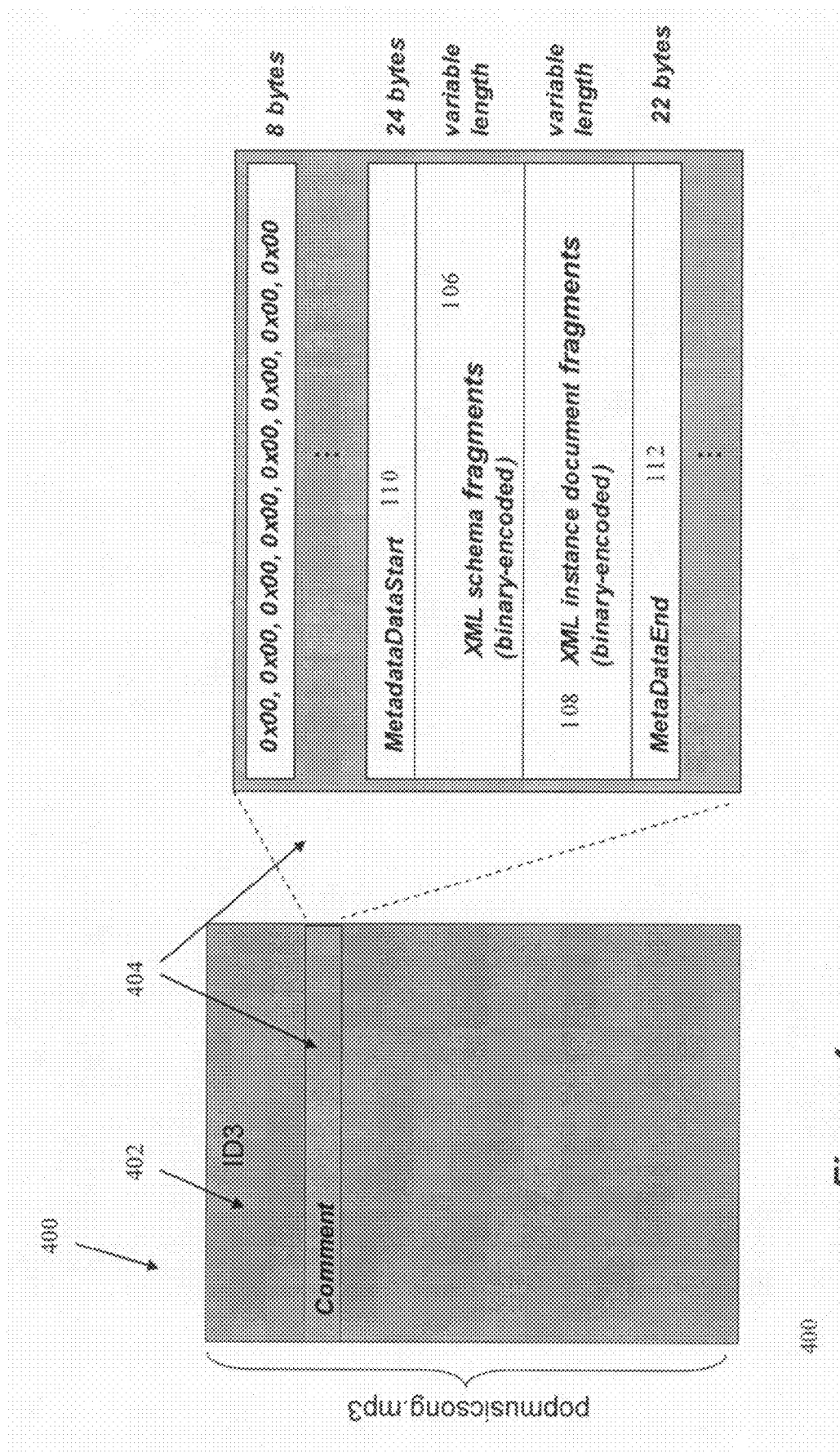
FIG. 4 comprises a representation of the structure of an ID3 header in accordance with various embodiments of the invention.

In one embodiment, illustrated in FIG. 4. an MP3 file is represented as the media file. The MP3 file 400 has a header 402 which is an ID3 header that includes a Comment field 404 similar to the UserComment tag of the EXIF file as discussed above. Rich metadata is stored in the same manner as discussed above in the Comment field of the ID3 tag of the MP3 file. One example of rich metadata that may be stored in the user comment field may be a user rating, 4 stars out of 5 for example. This example may also apply to images as discussed above. Another example is RFID data that is to be associated with the media file.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:

providing a metadata schema file and a metadata instance file;

providing a media file having a binary capable user field;

compressing the metadata schema into metadata schema fragments by a first compression method;

assembling the compressed metadata schema fragments;

compressing the metadata instance file into metadata instance fragments;

assembling the compressed metadata instance fragments;

setting a media file header to indicate binary data payload;

appending a data start file indicator to the assembled metadata schema and the assembled metadata instance;

inserting the assembled metadata schema and the metadata instance into the binary capable user field of the media file; and providing an extensible markup language (XML) schema and XML instance data as corresponds to an XML document;

processing the XML schema apart from the XML instance data to provide resultant compressed XML schema data;

processing the XML instance data to provide a corresponding XML instance table; and compressing the XML instance table to provide a resultant compressed XML instance table.

2. The method of claim 1, further comprising, inserting other binary data, not associated with metadata into the user field of the media file.

3. The method of claim 1, wherein the media file has an EXIF header.

4. The method of claim 3, further comprising inserting the assembled metadata schema and the metadata instance into a UserComment field of the EXIF header.

5. The method of claim 1, wherein the media file is an MPEG 1 Layer III (MP3) file including at least one of an ID3 header or an ID3 footer.

6. The method of claim 1, wherein the media file is a JPEG file.

7. The method of claim 1 further comprising appending after the metadata instance a data end file indicator.

8. The method of claim 1 wherein the XML instance table comprises at least one node code with corresponding node instance path information and node value information.

9. The method of claim 8 wherein compressing the XML instance table further comprises compressing a representation of the XML instance data.

10. The method of claim 9 wherein the at least one node code comprises a plurality of node codes wherein the plurality of node codes are differentially coded prior to being compressed.

11. The method of claim 9 wherein compressing a representation of the XML instance data comprises compressing node instance path information using a first compression technique and compressing node value information using a second compression technique with the first compression technique being different than the second compression technique.

12. The method of claim 11 wherein at least one of the first compression technique and the second compression technique is selected from a plurality of available compression techniques based at least in part on a quantity of information to be compressed.

* * * * *